United States Patent
Lukiyanets et al.

(10) Patent No.: US 8,621,733 B2
(45) Date of Patent: Jan. 7, 2014

(54) DEVICE FOR PREPARING THE END FACES OF THIN-WALLED JACKETS FOR WELDING

(75) Inventors: Sergey V. Lukiyanets, Zlicin (CZ); Nikolay G. Moroz, Mizosov (CZ)

(73) Assignee: Armotech S.R.O. (CZ)

( * ) Notice: Subject to any disclaimer, the term of this patent is extended or adjusted under 35 U.S.C. 154(b) by 306 days.

(21) Appl. No.: 13/059,281

(22) PCT Filed: Aug. 26, 2009

(86) PCT No.: PCT/EP2009/006184
§ 371 (c)(1),
(2), (4) Date: Feb. 16, 2011

(87) PCT Pub. No.: WO2010/022930
PCT Pub. Date: Mar. 4, 2010

(65) Prior Publication Data
US 2011/0131775 A1    Jun. 9, 2011

(30) Foreign Application Priority Data
Aug. 27, 2008  (RU) ................................ 2008134621

(51) Int. Cl.
*B21C 37/30*  (2006.01)
*B24B 39/00*  (2006.01)

(52) U.S. Cl.
USPC .......................................... 29/90.01; 72/115

(58) Field of Classification Search
USPC ............. 29/81.03, 81.04, 90.01; 72/112, 113, 72/115; 82/46; 228/17, 173.4
See application file for complete search history.

(56) References Cited

U.S. PATENT DOCUMENTS

| 172,443 | A * | 1/1876 | Ide ............................. 228/112.1 |
| 1,312,333 | A * | 8/1919 | Lebow ............................ 72/119 |
| 2,843,918 | A * | 7/1958 | Koppelmann ............... 29/90.01 |
| 3,307,254 | A * | 3/1967 | Williams ........................... 407/1 |
| 3,795,957 | A * | 3/1974 | Steusloff ...................... 29/90.01 |
| 4,133,089 | A * | 1/1979 | Heymanns ................... 29/90.01 |
| 6,497,022 | B1 * | 12/2002 | Carter .......................... 29/90.01 |
| 2007/0220727 | A1 * | 9/2007 | Cheatham et al. ........... 29/90.01 |

FOREIGN PATENT DOCUMENTS

JP    58167037 A  * 10/1983 ............. B21D 41/02

OTHER PUBLICATIONS

JP 58167037 A; 10-1983; Japan; Maruo, Tomohiko Translation.*

* cited by examiner

*Primary Examiner* — Alexander P Taousakis
*Assistant Examiner* — Lee Holly
(74) *Attorney, Agent, or Firm* — Andrew Wilford

(57) ABSTRACT

The invention relates to a device for preparing the end faces of thin-walled jackets for welding, comprising a housing (1), on which an annular separator (2) is mounted, said separator containing at least two groups of elongated deformation elements (4, 6). The longitudinal axes of the deformation elements (4) of a first group are aligned radially in relation to the central axis of the separator (2) and the longitudinal axes of the deformation elements (6) of a second group are aligned at an acute angle (α) in relation to a radial through the central axis of the separator (2).

13 Claims, 3 Drawing Sheets

DEVICE FOR PREPARING THE END FACES OF THIN-WALLED JACKETS FOR WELDING

CROSS REFERENCE TO RELATED APPLICATIONS

This application is the US national phase of PCT application PCT/EP2009/006184, filed 26 Aug. 2009, published 4 Mar. 2010 as 2010/022930, and claiming the priority of Russian patent application 2008134621 itself filed 27 Aug. 2008, whose entire disclosures are herewith incorporated by reference.

FIELD OF THE INVENTION

The invention relates to a device for preparing the end faces of thin-walled jackets for welding, in particular thin-walled tube blanks and the like made from stainless steel.

PRIOR ART

When welding particularly thin-walled products it is not possible to effect high quality fusion welding of end face joints without special preparation of the parts on the basis of the commensurability of the roughness parameters and the parameters of the difference in thicknesses of the end face joints with their thickness. To carry out welding of particularly thin-walled workpieces with large cross-sections, it is necessary to bring about complete congruence of the joint edges of the workpieces both with regard to thickness and with regard to circumference, taking account of concentricity and centering precision of the parts to be welded.

The reason for this is that, when performing full fusion welding, as a result of the random nature of the formation of the contact points at the joint end faces under the action of the flowing welding current, rapid overheating of the metal at the contact points takes place, together with ejection thereof out of the welding zone. Furthermore, it is not possible, in light of the specific peculiarities of heating the metal during uninterrupted fusion, to achieve the sufficiently wide heating zone necessary for high quality welding of workpieces of large cross-section. It should be added that on parts with surface irregularities, adsorption of various gases takes place, which, apart from leading to the above-stated effects, results in considerable difficulties when welding thin parts.

RU 2 288 827 C1 discloses the use of removable cutting tools and deforming rollers, which are arranged firmly in the cutting tool holders of the lathes for preparing the edges of tubes for welding, with which turning and cold forming of the end face of the tube is effected, wherein at the upper edge thereof a fitted projection is formed and wherein the end face of one of the tubes to be welded faces the cutting tool at an angle of 90° to the axis of the tube and the end face of the second tube is machined from inside likewise with a cutting tool at 90°, wherein in the upper part of the end face an annular projection remains with a thickness and length of no more than 4 mm, wherein this annular projection is then bent outward with a friction roller at an angle of 45 to 90° relative to the axis of the tube and the resultant bent back projection is turned, wherein its cross-section acquires the shape of the fitted projection, namely of an equilateral triangle or equilateral trapezium or of a rectangle, whereupon a cylindrical plane with an internal diameter equal to the external diameter of the end face of the first tube is turned in the end face beneath the fitted projection.

To realize such preparation of the edges of tubes for welding, standard machining apparatuses are used, such as removable cutting tools and deforming rollers, which are arranged firmly in the cutting tool holders of the lathes. Such machining of the edges the tubes using standard devices can however only be reclosed for wall thicknesses of the jackets to be welded of more than 3 mm. In addition, the disadvantages of the known device for carrying out the method in question must also include the impossibility of achieving the necessary machining cleanness of the surface layer of the parts prior to welding.

The devices which are proposed with the known methods for preparing edges of tubes for welding are not generally applicable when welding particularly thin-walled structures, since the use of standard devices of the cutting tool type or roller type and the means for securing them does not allow any preparation of end faces in the case of thin-walled jackets.

It is actually generally acknowledged that the preparation quality of the surface layer (roughness, unevenness, wear resistance, microhardness, residual stresses) of the parts has an effect on the quality of the weldability thereof.

OBJECT OF THE INVENTION

The object of the present invention may therefore be considered that of using structurally simple means to provide a device for preparing the end faces of thin-walled jackets for welding, with which device a high machining quality of the surfaces of the parts for welding may be achieved.

SUMMARY OF THE INVENTION

This object is achieved by a device for preparing end faces of thin-walled jackets for welding which comprises a housing, on which an annular separator is mounted, in which at least two groups of elongate deformation elements are arranged, the longitudinal axes of the deformation elements of a first group being oriented radially to the center axis of the separator and the longitudinal axes of the deformation elements of a second group being oriented at an acute angle with regard to respective radii from the center axis of the separator. In particular, a preferred device for preparing end faces of substantially flexible thin-walled jackets for welding comprises a housing, which takes the form of a round, horizontal support plate with an annular separator arranged thereon, which is provided with elongate deforming elements, wherein sectors with a group of deformation elements whose longitudinal axis is oriented along the radius of the annular separator of the support plate and sectors with a group of deformation elements whose longitudinal axis is oriented at an acute angle α to the radius of the annular separator, are formed alternately in the separator along the ring zone. For the purposes of the present application, an acute angle should be understood to be an angle of from 10° to 70°. The values of the angle α may also assume values in the range from 20° to 60°, most preferably from 35° to 50°. The ratio of the number of deformation elements of the first group to the number of deformation elements of the second group amounts substantially to between 3/1 and 6/1.

For the purpose of a simultaneous effect over the entire width of the thin-walled jacket from the side of its end face, the length of the deformation elements preferably exceeds the thickness of the thin-walled jacket by a multiple thereof. The deformation elements may take the form of needle rollers. Other forms of rollers or rolls are also possible, however, in principle also stationary deformation elements.

The diameter of the needle rollers is conveniently no greater than 3 to 5 times the thickness of the end face of the blank.

The roughness parameter of the deformation needle rollers preferably fulfils the condition Ra≤0.16 μm.

The hardness parameter of the material of the deformation needle rollers preferably fulfils the condition HRc>65.

The diameter of the deformation elements of the first group is preferably smaller by 0.02 to 0.03 mm than the diameter of the deformation elements of the second group.

The roughness parameter of the support plate in the zone of contact with the deformation elements preferably fulfils the condition Ra≤0.32 μm.

Each sector with radially arranged rollers is preferably configured such that it may enclose 5 to 12% of the surface of the end face to be deformed of the blank.

The device may additionally comprise a cylindrical separator with rollers, whose axis is oriented along the axis of the device, wherein the cylindrical separator is configured such that its internal diameter exceeds the diameter of a circle passing through the longitudinal centers of the deformation elements of the annular separator, or it fully encloses the annular separator.

EMBODIMENTS OF THE INVENTION

Figure 1:
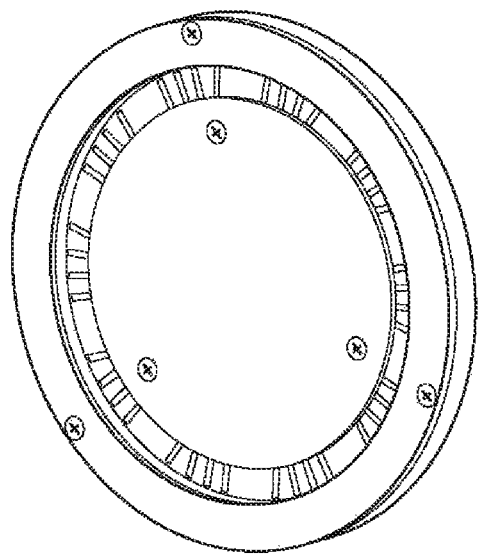
FIG. 1 shows a perspective view of a first embodiment of the device according to the invention.
Figure 2:
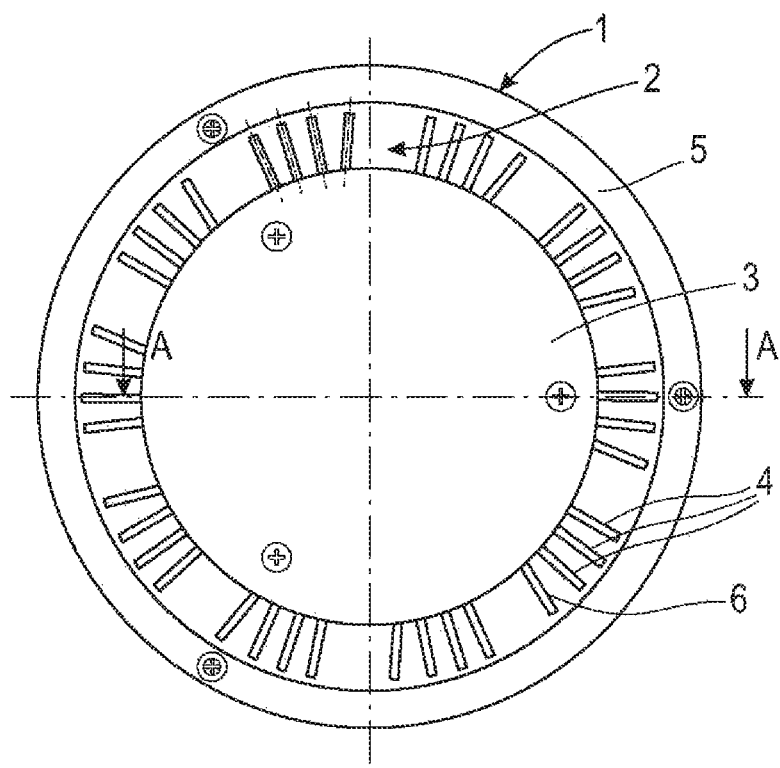
FIG. 2 shows a schematic end view of the device of FIG. 1.
Figure 3:
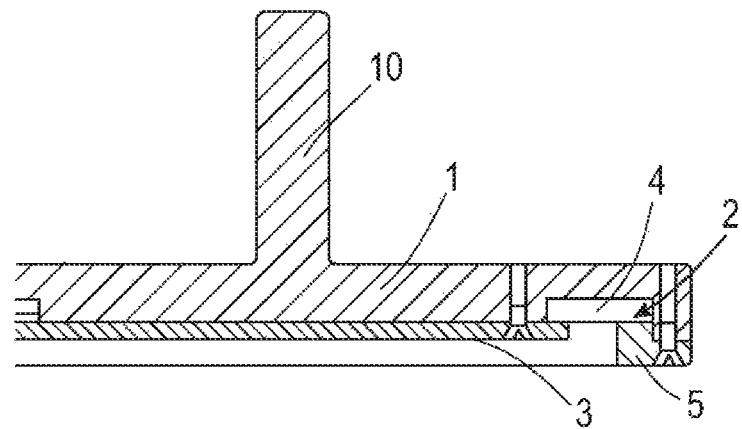
FIG. 3 shows the partial section A-A of FIG. 2.

The device of FIGS. 1 to 3 comprises a disc-shaped housing 1 with a holder 10 provided coaxially on the rear end face. Adjoining the outer circumference, an annular recess is formed on the front end face of the housing 1 concentrically to the center axis of the housing 1. An annular separator 2 is arranged coaxially in this recess. The separator comprises a number of rotatably mounted needle rollers 4, whose longitudinal axes extend radially in the direction of the center axis in a plane perpendicular to the center axis. Rotatably mounted needle rollers 6 are additionally provided, whose longitudinal axes lie in the plane of the longitudinal axes of the needle rollers 4 and are oriented at an acute angle to respective radii from the center axis. The annular separator 2 with the needle rollers 4, 6 is held in the recess at its inner circumference by means of the edge of a lid 3, which coaxially adjoins and is fastened to the rear end face of the housing. At the outer circumference, the separator 2 is held by a fastening ring 5 fixed to the lower end face of the housing, the outer circumference of which fastening ring corresponds to the outer circumference of the housing.

High quality machining may be achieved by machining the end faces of parts to be welded by plastic deformation by means of the needle rollers 4, 6. Plastic deformation of the surface to be machined brings about smoothing of irregularities originally present and the production of a new microrelief on the surface with a substantially lower irregularity height $R_z$.

Formation of a surface layer proceeds during deformation smoothing as a result of plastic deformation of the surface to be machined. Under the action of a radial force, which acts on the contact surface of the deformation tool with the part, contact pressures arise. If their magnitude exceeds the yield point of the part to be deformed, plastic deformation of its thin layers close to the surface occurs. During plastic deformation the surface layer has a specific fibrous structure (texture) with a crystalline lattice which is distorted relative to the original crystalline lattice.

The device functions as follows. By means of the holder 10 the device is arranged in a machine tool in such a way as to enable rotary motion about the center axis of the annular separator 2 or of the housing 1. The thin-walled metallic jacket to be machined is fed with its end face (not shown) to the deforming needle rollers 4, 6 of the device and pressed thereagainst with a previously determined force. On rotation of the device about the center axis, the radially oriented needle rollers 4 plastically deform the end face of the jacket, and the needle rollers 6, which are oriented at an angle to the radial, move the material resulting from the plastic deformation, as a function of the orientation of their angle of inclination to the radial, to the side of the inner or outer surface of the jacket to be machined and form a bead thereon, which is bent toward the inside or outside of the edge, to be prepared, of the jacket. The necessary dimensions of the resultant bead are formed in accordance with the number of revolutions. The quality of the surface of the end face to be machined of the jacket then corresponds to the quality of the surface of the deforming needle rollers. In practice the necessary force on the rollers amounts to 100 to 200 N. Therefore, and on the basis of the requirements for achieving plastic deformation in the material of the jacket to be machined, needle rollers are preferably selected which have a diameter which does not exceed 5 times the thickness of the end face of the jacket blank. The hardness of the material thereof preferably amounts to HRc>65 and the roughness parameter of the surface to Ra≤0.16 μm.

It is convenient to group the radially oriented needle rollers 4 and the needle rollers 6 arranged at an angle to the radius in separate sectors arranged along the annular separator 2 in an angularly spaced manner about the center axis, which sectors symmetrically enclose the entire end face of the jacket to be machined. Each sector is then configured such that it may enclose 5 to 12% of the surface of the end face to be deformed of the blank.

Figure 4:
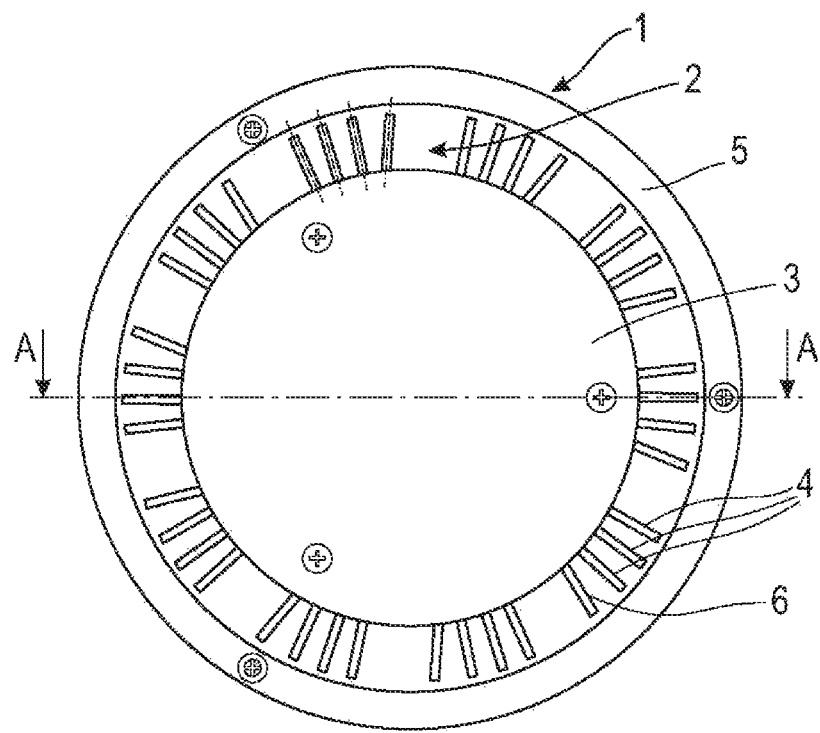
FIG. 4 shows a second embodiment of the device according to the invention.
Figure 5:
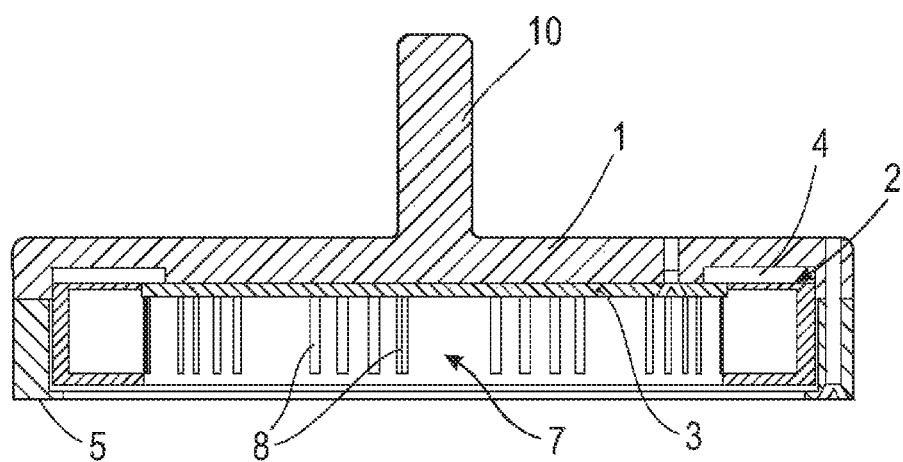
FIG. 5 shows the section A-A of FIG. 4.

In the embodiment illustrated in FIG. 4 a cylindrical separator 7 with circumferentially arranged needle rollers 8 arranged in the axial direction of the annular separator 2 is additionally mounted in the housing 1 coaxially to the annular separator 2.

The diameter of the circular line formed by the deformation elements 8 of the cylindrical separator 7 here exceeds the diameter of a circle extending through the longitudinal centers of the needle rollers 4, 6 of the annular separator 2. In this way, during machining of the end face of the jacket by the needle rollers 4, 6 of the annular separator 2, this jacket is externally stabilized and, if necessary, is subjected to supplementary machining by means of the needle rollers 8 of the cylindrical separator 7.

Use of the devices according to the invention makes is possible to prepare the end faces of thin-walled jackets to a quality sufficient for carrying out a welding process.

Use of the devices according to the invention offers a real possibility of welding closed containers in the form of thin-walled closed liner jackets. Application of the solution according to the invention has been tested on examples involving the welding of jackets with a wall thickness of 0.5 mm and diameters of 213 and 322 mm. Manufacture and testing of these thin-walled liner jackets, which were produced using the solution according to the invention, confirmed their high reliability and effectiveness.

INDUSTRIAL APPLICABILITY

The solution according to the invention is widely used in welding thin-walled tubes, receivers, expansion tanks, flasks and other products in the aerospace and chemical

The invention claimed is:

1. A device for preparing end faces of thin-walled jackets for welding, the device comprising:
a housing;
an annular separator on the housing and centered on a center axis; and
first and second groups of elongated cylindrical deformation rollers centered on respective longitudinal axes all lying in a common plane, the longitudinal axes of the deformation rollers of the first group being oriented radially to the center axis of the separator and the longitudinal axes of the deformation elements of a second group being oriented at an acute angle with regard to respective radii extending from the center axis of the separator, both groups of deformation rollers being arranged in sectors distributed in an angularly spaced manner about the center axis, the ratio of the number of deformation rollers of the first group to the number of deformation rollers of the second group amounting to between 3:1 and 6:1.

2. The device according to claim 1, wherein angles between the longitudinal axes of the deformation rollers of the second group relative to the respective radii from the center point of the separator is from 10° to 70°.

3. The device according to claim 2, wherein the angles between the longitudinal axes of the second group of deformation rollers relative to the respective radii from the center point of the separator is from 35° to 50°.

4. The device according to claim 1, wherein the deformation rollers are needle rollers.

5. A device for preparing end faces of thin-walled jackets for welding, the device comprising:
a housing;
an annular separator on the housing and centered on a center axis; and
first and second groups of elongate cylindrical needle rollers centered on respective longitudinal axes all lying in a common plane, the longitudinal axes of the deformation rollers of the first group being oriented radially to the center axis of the separator and the longitudinal axes of the deformation elements of a second group being oriented at an acute angle with regard to respective radii extending from the center axis of the separator, diameters of the needle rollers not exceeding 3 to 5 times a radial thickness of the end face of the thin-walled jackets to be deformed.

6. The device according to claim 5, wherein a roughness parameter of the needle rollers conforms to the relation $Ra \leq 0.16$ μm.

7. The device according to claim 5, wherein a hardness parameter of the material of the needle rollers conforms to the relation $HRc > 65$.

8. The device according to claim 1, wherein diameters of the deformation rollers of the first group is 0.02 to 0.03 mm smaller than diameter of the deformation rollers of the second group.

9. The device according to claim 1, wherein a roughness parameter of the housing in the contact zone with the deformation rollers conforms to the relation $Ra \leq 0.32$ μm.

10. A device for preparing end faces of thin-walled jackets for welding, the device comprising:
a housing;
an annular separator on the housing and centered on a center axis; and
first and second groups of elongated cylindrical deformation rollers centered on respective longitudinal axes all lying in a common plane, the longitudinal axes of the deformation rollers of the first group being oriented radially to the center axis of the separator and the longitudinal axes of the deformation elements of a second group being oriented at an acute angle with regard to respective radii extending from the center axis of the separator;
a cylindrical separator coaxial to the annular separator; and
angularly spaced elongate deformation elements having axes that extend parallel to the center axis of the annular separator, an internal diameter of the cylindrical separator exceeding a diameter of a circle passing through longitudinal center points of the deformation elements of the annular separator.

11. The device according to claim 10, wherein both groups of deformation rollers are arranged in sectors distributed in an angularly spaced manner about the center axis, the ratio of the number of deformation rollers of the first group to the number of deformation rollers of the second group amounting to between 3:1 and 6:1.

12. The device according to claim 11, wherein each sector with deformation rollers is configured such that it covers 5 to 12% of the annular surface of the annular separator.

13. The device according to claim 10, wherein the deformation elements of the cylindrical separator are needle rollers.

* * * * *